United States Patent Office 3,663,519
Patented May 16, 1972

3,663,519
COPOLYMERS OF VINYL CHLORIDE
Robert Buening, Troisdorf-Sieglar, Germany, assignor to Dynamit Nobel Aktiengesellschaft, Troisdorf, Germany
No Drawing. Filed Mar. 31, 1970, Ser. No. 24,399
Claims priority, application Germany, Apr. 2, 1969, P 19 17 011.7
Int. Cl. C08f 15/40
U.S. Cl. 260—80.81   5 Claims

ABSTRACT OF THE DISCLOSURE

Copolymers of vinyl chloride, vinyl esters of saturated, alpha-alkyl-substituted monocarboxylic acids having 9 to 19 carbon atoms and ethylene and/or propylene.

---

Copolymers of vinyl chloride and vinyl esters of mixtures of saturated, alpha-alkyl-substituted monocarboxylic acids having 9 to 19 carbon atoms are known from U.S. Pat. 3,186,974 and German Auslegeschrift 1,092,202. They are characterized by hardness and flexibility. Manufacturing experiments have shown, however, that these copolymers must, like all previously known types of PVC, be used with stabilizers. Furthermore, the copolymers previously described are insoluble or no more than swellable or very poorly soluble in acetone.

It has now been found that the physical technological properties of the copolymers of vinyl chloride and vinyl esters can be greatly improved by copolymerizing vinyl chloride and vinyl esters of saturated, alpha-alkyl-substituted monocarboxylic acids, by suspension polymerization, emulsion polymerization, solution polymerization, precipitation polymerization and/or block polymerization, in such a manner that vinyl esters of the general formula:

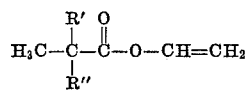

wherein R' can be hydrogen or a branched or unbranched alkyl radical, R" can be a branched or unbranched alkyl radical, and R' and R" can also be a common component of a cycloaliphatic ring, the number of carbon atoms in the monocarboxylic acid ranging from 9 to 19, preferably 9 to 11, or mixtures thereof are used as the vinyl esters and if ethylene and/or propylene is additionally copolymerized thereinto.

In the case of suspension polymerization, for example, of vinyl chloride with the above-named vinyl esters alone, an opaque and more or less porous granular polymer is obtained. If, however, propylene is copolymerized (about 6% added for example, of which slightly more than about one half enters the polymerization) into the system, glassy polymer granules are obtained which have a high bulk density. This terpolymer is soluble in acetone and can be used, for example, in the paint industry. Furthermore, such copolymers can be directly molded or extruded without any stabilizer, in contrast to other known vinyl chloride copolymers.

If the copolymerization of vinyl chloride according to the invention is performed, however, in the presence of ethylene, copolymers are obtained which are also soluble in acetone. They can also be molded and extruded without additional stabilizers or plasticizers. Furthermore, these terpolymers behave like soft PVC. Copolymers of vinyl chloride having a so-called internal plasticizing have been described in the literature, examples being copolymers of vinyl chloride with monomers bearing long-chained alkyl radicals such as vinyl stearate. None of the so-called internally plasticized copolymers known to date, however, can be compared with externally plasticized polyvinyl chloride as regards elasticity and flexibility, because in spite of the so-called internal plasticizing they behave more like hard PVC, or, in the case of very low copolymerized vinyl chloride contents, they behave like liquids of high viscosity. On the other hand, externally plasticized types of PVC have to be heated to above 150° C. to plasticize them.

The manufacture of the copolymers according to the invention can be performed by the known suspension, emulsion, solution, block and/or precipitation polymerization processes. The purity of the vinyl chloride, vinyl ester, ethylene and propylene is generally the same as it is in other conventional polymerization processes.

The vinyl esters of single or mixtures of saturated, alpha-alkyl-substituted monocarboxylic acids of the general formula:

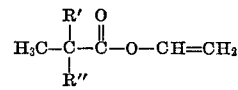

wherein R' can be hydrogen as well as a branched or unbranched alkyl radical, R" a branched or unbranched alkyl radical, and R' and R" can also be a common component of a cycloaliphatic ring, the number of carbon atoms in the monocarboxylic acid ranging from 9 to 19 and preferably from 9 to 11, can be manufactured in a known manner, for example by Koch's or Reppe's synthesis from the corresponding olefins by the addition of carbon monoxide and water. Especially suitable are those olefins which have been produced by the polymerization or copolymerization of olefins of low molecular weight, such as ethylene, propylene or butylene. Also suitable are the primary olefins of the Fischer-Tropsch syntheses and cleavage olefins. The acids of the described type are referred to in the literature also as Koch acids.

The manufacture of the acids and of the vinyl esters thereof is described, for example, in U.S. Pat. 3,186,974. The manufacture of a mixture of acids containing 9 to 11 carbon atoms per molecule can be performed as follows: The starting material is a fraction of a product that has been obtained by cracking a paraffinic material in the vapor phase in the presence of water vapor, and that consists largely of alkenes having 8 to 10 carbon atoms. This fraction is then partially hydrogenated in order to transform dienes to alkenes.

The olefins thus obtained are fed to the reactor at a rate of 0.7 liter per hour and transformed at 60° C. to the monocarboxylic acids. The catalyst consists of H₃PO₄, BF₃ and H₂O in a molar ratio of 2:3:2, and is fed to the reactor at a rate of 1.4 liters per hour. The liquid portion of the reaction mixture is kept at a volume of 3 liters. The liquid is under a carbon monoxide pressure of 70 atmospheres gauge. The mixture is rapidly agitated. The apparatus consists of chrome-nickel steel. When the reaction mixture leaves the reaction chamber, the two liquid phases are separated. The carboxylic acids are washed first with water and then with an aqueous solution of sodium bicarbonate. The carboxylic acids liberated are finally distilled in vacuo after drying.

The transformation of the carboxylic acids to the vinyl esters is performed by transesterification of vinyl acetate in the presence of phosphate of mercury. The esters thus obtained are distilled at 50–70° C. and 0.8 mm./Hg and are finally washed with a dilute solution of sodium hydroxide so as to remove all traces of free acids.

Esters or ester mixtures of acids containing 12 to 14 and 15 to 19 carbon atoms, respectively, can be produced in like manner from olefins or olefin fractions containing 11 to 13 and 14 to 18 carbon atoms, respectively, and can be transformed to the corresponding vinyl esters or mixtures, as the case may be, in the same manner.

The conditions of polymerization are substantially the same as those used in the manufacture of vinyl chloride homopolymers.

In the suspension and emulsion polymerization processes, the reaction is usually performed at temperatures of 0 to 80° C. If antifreezes are used, however, it can be performed at still lower temperatures. In the case of the solution, precipitation and block polymerization methods, temperatures ranging from −30 to +80° C. are customary.

The copolymerization can be initiated and catalyzed by conventional methods. As a rule, catalysts are used which supply free radicals, such as peroxides and/or azo compounds. Redox systems can also be used in the known manner. Polymerization, however, can also be started by irradiation with, for example, ultraviolet light. For the suspension polymerization process, for example, peroxides can be used, such as dialkyl-peroxydicarbonates, diisopropylperoxydicarbonate, etc., per acids, benzoyl peroxide, perpivalate, lauryl peroxide, diacyl peroxides, dibenzoyl peroxides, dilauryl peroxides, cyclohexanesulfonyl acetyl peroxide, di-trichloracetyl peroxide, hydroperoxides, and the like, and so can azo compounds, such as azoisobutyric acid nitrile or the like.

The catalysts for precipitation, solution and block polymerization processes are substantially the same as those for suspension polymerization.

For emulsion polymerization, inorganic per compounds are preferred, in the presence in some cases of reducing agents such as ascorbic acid, dioxymaleic acid and the like, which are soluble in the aqueous phase, examples being hydrogen peroxide, persulfates, potassium persulfate, percarbonates and other similar materials.

In suspension polymerization the customary suspension adjuvants are used, such as ethoxylated cellulose, polyvinyl alcohol, gelatines, copolymers of maleic acid and another unsaturated compound or partial esters thereof, methyl cellulose or other water-soluble polysaccharides, polyvinylpyrrolidone, etc.

In the emulsion polymerization processes the known emulsifiers can also be used, such as alkyl sulfonates, arylalkyl sulfonates or their salts, polyalkylene oxides, soaps of high fatty acids, etc.

A further aspect of the invention is the copolymers based on vinyl chloride which consist of:

(A) 20 to 45 wt. percent of vinyl ester units of esters or ester mixtures of the general formula:

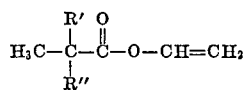

wherein R′ and R″ have the same meaning as above;
(B) 0.5 to 10 wt. percent of ethylene units and/or 0.5 to 6 wt. percent of propylene units; and
(C) balance of vinyl chloride to make up 100% by weight.

The copolymers according to the invention with even small quantities of copolymerized ethylene, however, can be worked without stabilizers, at temperatures from 90° C. to about 135° C., directly in powder form, to produce extrusions of high elasticity and pliability.

The copolymers of the present invention furthermore have a relatively small softening range and can therefore be used as raw material for foam plastics, with the aid of blowing agents, low-boiling organic solvents such as hexane etc., and gas-yielding compounds such as azo compounds etc. Such foam articles have conventional utility.

The copolymers and the process of the present invention will be explained by means of the following examples:

EXAMPLE 1

The following components were placed in a 5-liter autoclave (working pressure up to 200 atm.):
1910 cc. desalted water, 285 cc. of a solution of 1% by weight of ethoxylated methyl cellulose (which can be obtained commercially under the name Tylose MH 50) 1.6 g. of di-i-propyl percarbonate, 3.2 g. of perpivalate, 300 g. of a vinyl ester mixture of saturated, alpha-alkyl-substituted monocarboxylic acids with 9 to 11 carbon atoms (which is commercially obtainable under the name VeoVa 911, product of Shell Chemie G.m.b.H.) and 450 g. of vinyl chloride. The mixture was heated to 45° C. and oxygen-free ethylene was forced in at 50 atmospheres. A vane type stirrer served as the stirring element (480 r.p.m.). After 17 hours of polymerization time, 769 grams of copolymer were obtained having the following analysis: C, 54.55%; H, 7.64%; O, 6.53% and Cl, 31.76%. From this the following composition can be computed: 56.0 wt. percent vinyl chloride, 40.9 wt. percent vinyl ester and 3.7 wt. percent ethylene. K value: 52.8. Vicat temperaure: 20° C. The copolymer is soluble in acetone.

The copolymer was made into a strand of 7 mm. diameter in a laboratory extruder (single-spindle screw, 3 heating chambers) made by Brabender of Duisburg. For this purpose the copolymer was placed without additives in the extruder, and the following conditions were maintained: temperature of chamber 1=130° C., chamber 2=115° C., and chamber 3=68° C.

This procedure is unusual, because generally the temperature sequence should have been the reverse, as it is in the case of other so-called internally plasticized PVC types. In the case of the copolymers according to the invention, however, the jelling is performed by cooling the molten plastics. This offers a technical advantage, because a high throughput is assured in this manner. This rheological behavior is advantageous in other methods of working, too, such as casting, rotational casting, etc. (centrifugal casting).

EXAMPLE 2

The following components were placed in a 10-liter autoclave (working pressure up to 30 atm.):
4200 cc. desalted water, 190 cc. of a solution of 3% by weight of Tylose MH 50 (see Example 1), 14.3 g. of dilauroyl peroxide, 2 g. of cyclohexanesulfonyl acetyl peroxide, 650 g. of VeoVa 911 (see Example 1), 1484 g. of vinyl chloride and 66 g. of propylene. The polymerization temperature was 48° C. The autoclave was equipped with a vane type agitator that rotated at 390 r.p.m. The polymerization lasted 20 hours. Yield: 1569 grams. The suspension granulate consisted, in contrast to known types of PVC, of glassy, transparent globules with a bulk density of 0.81.

*Analysis.*—Cl, 35.36%; O, 5.61%; K value 47.7; Vicat temperature 40.0° C.; propylene content=2.5 wt. percent (infrared compensation process); soluble in acetone.

The copolymer obtained was extruded as described in Example 1, but under the following conditions: Temperature of chamber 1=90° C., chamber 2=125° C., chamber 3=135° C.

A glass-clear strand was obtained, but the material was harder, as shown by a comparison of the Shore hardnesses:

|  | Shore Hardness A | Shore Hardness D |
|---|---|---|
| Example 1 | 94 | 60 |
| Example 2 | 97 | 77 |

A flexible, pliable strand was obtained in Example 1, whereas a hard, stiff strand was produced in Example 2.

What is claimed is:

1. A copolymer consisting essentially of moieties of:
   (a) about 20 to 45 weight percent of at least one vinyl ester having about 11 to 21 carbon atoms therein and wherein the ester has the general formula:

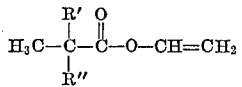

wherein R' is a member selected from the group consisting of hydrogen and alkyl groups, R" is an alkyl group or R' and R" taken together with the carbon atom to which they are attached are a cycloalkylene ring;
   (b) at least one member selected from the group consisting of about 0.5 to 10 weight percent ethylene and about 0.5 to 6 weight percent propylene; and
   (c) vinyl chloride.
2. A copolymer as claimed in claim 1 wherein said acid moiety contains about 9 to 11 carbon atoms.
3. A copolymer as claimed in claim 1 containing said vinyl ester, said vinyl chloride and ethylene.
4. A copolymer as claimed in claim 1 containing said vinyl ester, said vinyl chloride and propylene.
5. A copolymer as claimed in claim 1, comprising moieties of a mixture of esters according to said ester formula.

References Cited

UNITED STATES PATENTS

| 3,186,974 | 6/1965 | Verberg | 260—85.7 |
| 3,498,938 | 3/1970 | Grommers et al. | 260—17 |
| 3,541,061 | 11/1970 | Heiberger | 260—80.78 |

JOSEPH L. SCHOFER, Primary Examiner

S. M. LEVIN, Assistant Examiner

U.S. Cl. X.R.

260—32.8 R, 80.78, 87.1, 92.8 R